United States Patent
Ha et al.

(10) Patent No.: US 12,014,842 B2
(45) Date of Patent: Jun. 18, 2024

(54) HIGH TEMPERATURE SUPERCONDUCTOR HAVING MULTIPLE SUPERCONDUCTING LAYERS, AND HIGH TEMPERATURE SUPERCONDUCTOR MANUFACTURING METHOD FOR SAME

(71) Applicant: KOREA ELECTROTECHNOLOGY RESEARCH INSTITUTE, Changwon-si (KR)

(72) Inventors: Hong Soo Ha, Changwon-si (KR); Gwan Tae Kim, Gimhae-si (KR); Hyun Woo Noh, Changwon-si (KR); Ho Sup Kim, Gimhae-si (KR); Sang Soo Oh, Gimhae-si (KR)

(73) Assignee: KOREA ELECTROTECHNOLOGY RESEARCH INSTITUTE (KR)

( * ) Notice: Subject to any disclaimer, the term of this patent is extended or adjusted under 35 U.S.C. 154(b) by 212 days.

(21) Appl. No.: 17/701,880

(22) Filed: Mar. 23, 2022

(65) Prior Publication Data
US 2022/0246329 A1    Aug. 4, 2022

Related U.S. Application Data

(63) Continuation of application No. PCT/KR2020/006611, filed on May 21, 2020.

(30) Foreign Application Priority Data

Sep. 27, 2019  (KR) .................... 10-2019-0119951

(51) Int. Cl.
*H01B 12/06* (2006.01)
*H01B 13/00* (2006.01)
*H01B 13/22* (2006.01)

(52) U.S. Cl.
CPC ......... *H01B 12/06* (2013.01); *H01B 13/0016* (2013.01); *H01B 13/22* (2013.01)

(58) Field of Classification Search
CPC .............................. H01B 12/02; H01B 12/06
See application file for complete search history.

(56) References Cited

U.S. PATENT DOCUMENTS

2002/0144838 A1* 10/2002 Fritzemeier ........ H10N 60/0324
174/125.1

FOREIGN PATENT DOCUMENTS

| JP | 2004253473 A | 9/2004 |
| JP | 2012248744 A | 12/2012 |

(Continued)

OTHER PUBLICATIONS

International Search Report (PCT/KR2020/006611), WIPO, Sep. 17, 2020.

*Primary Examiner* — Jeremy C Norris
(74) *Attorney, Agent, or Firm* — Park & Associates IP Law Office

(57) ABSTRACT

Proposed is a high temperature superconducting wire manufacturing method and a high temperature superconducting wire having multiple superconducting layers formed by applying the method. The method includes a stacking process in which a pair of protective layers of superconducting wires including a substrate, a superconducting layer, and the protective layer are stacked such that the protective layers face each other, a joining process in which the protective layers facing each other are diffusion joining together by thermal treatment and become a joining protective layer, an exfoliating process in which a layered structure of an upper portion of the corresponding superconducting layer is removed such that one side of the superconducting layer is exposed to the outside, and an outermost protective layer forming process in which an outer protective layer formed of (Continued)

the same material as the joining protective layer is formed on the upper portion of the exposed superconducting layer.

12 Claims, 12 Drawing Sheets

(56) References Cited

FOREIGN PATENT DOCUMENTS

| | | |
|---|---|---|
| KR | 1020150067817 A | 6/2015 |
| KR | 1020160019684 A | 2/2016 |
| KR | 1020170052188 A | 5/2017 |
| KR | 10-1845474 B1 | 4/2018 |
| KR | 10-2019-0051009 A | 5/2019 |

* cited by examiner

# HIGH TEMPERATURE SUPERCONDUCTOR HAVING MULTIPLE SUPERCONDUCTING LAYERS, AND HIGH TEMPERATURE SUPERCONDUCTOR MANUFACTURING METHOD FOR SAME

REFERENCE TO RELATED APPLICATIONS

This is a continuation of International Patent Application PCT/KR2020/006611 filed on May 21, 2020, which designates the United States and claims priority of Korean Patent Application No. 10-2019-0119951 filed on Sep. 27, 2019, the entire contents of which are incorporated herein by reference.

FIELD OF THE INVENTION

The present disclosure relates to a high temperature superconducting wire having multiple superconducting layers in which a ratio of superconducting layers per unit area is increased by stacking a plurality of superconducting layers, and to a high temperature superconducting wire manufacturing method for the same.

BACKGROUND OF THE INVENTION

A superconducting phenomenon is a physical phenomenon in which resistance of a substance reaches zero at a temperature below a critical temperature, and a superconducting wire manufactured by using the superconducting phenomenon has excellent characteristics in aspects of large current conduction, strong magnetic field generation, and so on. In addition, by using the characteristics of the superconducting wire as described above, it is possible to increase performance of a product as well as to realize miniaturization of the product.

Therefore, development of electric power devices such as a superconducting magnet, a superconducting cable, a superconducting motor, a superconducting generator, and so on has been performed and also development of medical devices such as an NMR, an MRI, and so on and development of scientific devices such as an accelerator, a nuclear fusion device, and so on have been continuously performed in order to utilize the superconducting wire in the various industrial fields.

Meanwhile, the superconducting wire is divided into a lower temperature superconducting wire (LTS) and a high temperature superconducting wire (HTS).

The HTS has a superconducting characteristic near an absolute temperature of 100 K (−173° C.). That is, compared to the LTS in which a critical temperature is close to an absolute temperature of 0 K (−273° C.), the HTS has the superconducting characteristic at the relatively high temperature, so that an application field of the HTS may be increased, and the HTS in a thin film type has been manufactured and utilized.

Generally, the HTS in the thin film type is manufactured by forming a plurality of buffer layers on an upper portion of a metal substrate and then physically or chemically stacking a superconducting layer on upper portions of the plurality of buffer layers. In addition, according to the required electrical characteristics, a protective layer and a stabilizing layer may be additionally stacked on an upper portion of the superconducting layer as necessary.

The HTS in the thin film type having the configuration as described above has difficulties in large current conduction of at least 1000 A since the superconducting layer is generally formed in a single layer. Therefore, in order for the large current conduction of the HTS, efforts have been made to form a multi-layer structure of the HTS by assembling the plurality of superconducting wires.

Meanwhile, the most common method for assembling the superconducting wires is a method of connecting the superconducting wires in parallel by soldering the superconducting wires to each other.

However, when the superconducting wires are assembled by performing the soldering as described above, resistance between the wires is relatively high, so that a deterioration of a superconducting performance occurs. Further, since an overall resistance of the assembled superconducting wires are not uniform due to separation of a soldering portion, a current flow is excessive to one side and the temperature inside the superconducting wires increases, so that there is a problem that a superconducting state may be broken.

In order to solve this problem, conventional technologies such as a technology of connecting superconducting wires together in a longitudinal direction, a technology of electroplating a surrounding portion of a superconducting wire, a technology of joining filaments between multi-core superconducting wires together, a technology of coating a bullet-shaped superconducting wire with a stabilizing material again, and a technology of reducing the resistance of normal conductive parts through soldering have been developed.

However, the conventional technologies as described above require a lot of time and high production cost. In addition, when a separate superconducting wire or another electric connector is to be connected to a superconducting wire to which a metal stabilizing material is coupled, the soldering is performed again. At this time, heat generated through the soldering influences the previously soldered parts, and problems that the superconducting wire and the previously soldered parts are separated and so on have been generated.

Meanwhile, in order to solve the problems as described above, in "METHOD FOR BONDING STACKED SUPERCONDUCTING WIRES, AND SUPERCONDUCTING WIRE UNIT STACK-BONDED BY SAME (KR 1845474 B1)" a technology in which copper (Cu) is deposited by a vacuum deposition method on a region where a plurality of superconducting wires is stacked together under a vacuum atmosphere and the superconducting layers are joined together while forming a copper stabilizing layer is disclosed.

In detail, FIG. 1 is a view illustrating a joining process of stacked superconducting wires according to a conventional technology.

Referring to FIG. 1, in order to form a multi-layer superconducting layer, surfaces of a plurality of superconducting wires 11 and 12 are washed S1a, and then the plurality of superconducting wires 11 and 12 are spaced apart from each other and are loaded into a vacuum chamber S2a. Further, a copper 10 in a pure state is vacuum deposited between the superconducting wires S3a, and then the copper 10 becomes a copper stabilizing layer 13 by passing through a pressure-applying roller S4a.

In the stacked superconducting wire manufactured through the process as described above, separation of the copper stabilizing layer 13 caused by a difference in a coefficient of thermal expansion may be prevented even if the stacked superconducting wire moves from a room temperature condition to a cryogenic condition, and is capable of conducting a large current.

However, when a superconducting layer of two or more layers is formed, the same process is required to be performed while the plurality of superconducting wires is spaced apart from each other. However, when the superconducting layer is additionally stacked, heat is applied to the copper stabilizing layer 13 and interface strength is lowered. That is, in the conventional technology, there is a problem that an additional application of a thermal treatment so as to form a superconducting layer having two or more layers is difficult to be performed on the superconducting wire.

In addition, when a plurality of superconducting layers is formed, there is a problem that overall thickness of the stacked superconducting wire increases as a plurality of buffer layers and substrates are formed together with the plurality of superconducting layers.

Meanwhile, a separation technology may be applied in order to solve the problem of thickness increase.

FIG. 2 is a view illustrating a reel-to-reel separation system according to a conventional technology, and a technology of mechanically separating a superconducting layer after a stress level between the superconducting layer and the buffer layer is increased by applying an external action is illustrated in FIG. 2.

To this end, the separation system of the conventional technology includes a plurality of reels 41, 42, and 43 for winding a superconducting wire, a plurality of idler rollers 61, 62, 63, and 64 for applying tension, an inductive coil 52 for increasing a stress level, and a stepper motor 51 and a tape guide 53 that are for stably transferring the superconducting wire.

That is, in the separation system of the conventional technology, stress is applied on the superconducting wire during a process of transferring the superconducting wire through the reels 41, 42, and 43, and coupling force between the buffer layer and the superconducting layer is reduced, and then the buffer layer and the superconducting layer are exfoliated by applying physical force. In addition, thermal stress caused by an external source such as the inductive coil 52, infrared rays, or radio frequency radiation rays is applied as the stress applied on the superconducting wire at this time.

Therefore, when the thermal stress is applied as described above, it is preferable to use a wire in which coating is performed up to a stabilizing layer, i.e., a copper (Cu) layer. Since the stress is applied on the superconducting wire, it is difficult to perform the exfoliation process multiple times.

SUMMARY OF THE INVENTION

An objective of the present disclosure is to provide a high temperature superconducting wire having multiple superconducting layers in which a ratio of superconducting layers per unit area is increased.

Another objective of the present disclosure is to provide a high temperature superconducting wire having multiple superconducting layers capable of supplementing a layered structure according to the required physical properties while a multi-layered structure of the superconducting layers is maintained.

Still another objective of the present disclosure is to provide a high temperature superconducting wire manufacturing method capable of allowing a plurality of superconducting layers are formed by stacking and joining the plurality of superconducting layers that are separately manufactured.

Yet another objective of the present disclosure is to provide a high temperature superconducting wire manufacturing method capable of reducing a stacked thickness of a high temperature superconducting wire in which multiple superconducting layers are stacked.

According to an aspect of the present disclosure, there is provided a high temperature superconducting wire having multiple superconducting layers, the high temperature superconducting wire including: a main substrate; at least one buffer layer provided on an upper portion of the main substrate; at least two superconducting layers provided on an upper portion of the buffer layer; at least one joining protective layer provided on each space between the superconducting layers; and an outer protective layer formed of a same material as the joining protective layer and provided on an upper portion of an outermost superconducting layer.

According to another aspect of the present disclosure, there is provided a high temperature superconducting wire having multiple superconducting layers, the high temperature superconducting wire including: a main substrate; a first buffer layer provided on an upper portion of the main substrate; a first superconducting layer provided on an upper portion of the first buffer layer; a second superconducting layer provided on an upper portion of the first superconducting layer; a joining protective layer provided between the first superconducting layer and the second superconducting layer and configured to connect the first superconducting layer and the second superconducting layer together; and an outer protective layer formed of a same material as the joining protective layer and provided on an upper portion of the second superconducting layer.

According to still another aspect of the present disclosure, there is provided a high temperature superconducting wire having multiple superconducting layers, the high temperature superconducting wire including: a main substrate; a first buffer layer provided on an upper portion of the main substrate; a first superconducting layer provided on an upper portion of the first buffer layer; a second superconducting layer provided on an upper portion of the first superconducting layer; a first joining protective layer provided between the first superconducting layer and the second superconducting layer and configured to connect the first superconducting layer and the second superconducting layer together; a third superconducting layer provided on an upper portion of the second superconducting layer; a second joining protective layer provided between the second superconducting layer and the third superconducting layer and configured to connect the second superconducting layer and the third superconducting layer together; and an outer protective layer provided on an upper portion of the third superconducting layer, the outer protective layer being stacked by a same structure as a stacked structure in which another joining protective layer between the second superconducting layer and the third superconducting layer and the third superconducting layer are stacked, thereby being provided on an upper portion of a 3+N-th superconducting layer after still another joining protective layer and another superconducting layer are repeatedly constructed N times on the upper portion of the third superconducting layer.

In addition, according to an aspect of the present disclosure, there is provided a high temperature superconducting wire manufacturing method, the method including: a stacking process in which protective layers of a pair of superconducting wires including at least a substrate, a superconducting layer, and the protective layer are stacked such that the protective layers are facing each other; a joining process in which the protective layers facing each other are diffusion joining together by performing a thermal treatment on the pair of superconducting wires that are stacked and the protective layers become a joining protective layer; an exfoliating process in which a layered structure on an upper portion of a corresponding superconducting layer is removed such that the superconducting layer on one side among the superconducting layers formed with the joining protective layer is exposed to an outside; and an outermost protective layer forming process in which an outer protective layer formed of a same material as the joining protective layer is formed on the upper portion of the superconducting layer that is exposed to the outside through the exfoliating process.

According to another aspect of the present disclosure, there is provided a high temperature superconducting wire manufacturing method, the method including: a stacking process in which a first superconducting wire including a substrate, a first buffer layer, a first superconducting layer, and a first protective layer and a second superconducting wire including another substrate, a second superconducting layer, and a second protective layer are stacked together such that the first protective layer and the second protective layer are facing each other; a joining process in which the stacked first and second protective layers are diffusion joining together by performing a thermal treatment and become a joining protective layer; an exfoliating process in which a layered structure on an upper portion of the second superconducting layer is removed such that the second superconducting layer is exposed to an outside; an outer protective layer forming process in which an outer protective layer formed of a same material as the joining protective layer is formed on the upper portion of the second superconducting layer that is exposed to the outside; an additional stacking process in which an N-th protective layer of an N-th superconducting wire including still another substrate, an N-th superconducting layer, and the N-th protective layer is facing with the outer protective layer and is stacked; an additional joining process in which the outer protective layer and the N-th protective layer that are stacked are diffusion joining together by performing the thermal treatment and become an additional joining protective layer; an additional exfoliating process in which a layered structure on an upper portion of the N-th superconducting layer is removed such that the N-th superconducting layer is exposed to the outside; and an additional outermost protective layer forming process in which an additional outer protective layer formed of a same material as the additional joining protective layer is formed on the upper portion of the N-th superconducting layer that is exposed by performing the additional exfoliating process, wherein the additional stacking process, the additional joining process, the additional exfoliating process, and the additional outermost protective layer forming process are repeatedly performed N−2 times according to the number of superconducting layers that are stacked (here, N is a natural number equal to or greater than 3).

According to the present disclosure having characteristics as described above, there is an advantage that the multiple superconducting layers can be formed by easily and additionally stacking the superconducting layers according to the required current density.

In addition, since the metal stabilizing layer, the buffer layer, and so on are easily added, a layered structure can be variously formed according to the required physical properties.

In addition, a loss of alternating current may be reduced since the superconducting layers are separated from each other by the joining protective layer. Further, there is no joining interface since the diffusion joining is performed, so that separation of joining portion according to the difference in the coefficient of thermal expansion may be prevented.

In addition, since the joining protective layer can be continuously manufactured under the atmospheric pressure, the manufacturing process and the manufacturing device may be simplified.

Further, since the gap between the stacked protective layers is filled with the paste formed of the same material as the protective layers and the thermal treatment is performed on the gap before the joining protective layer is formed, the substrate may be effectively exfoliated from the superconducting layer during performing the process of exfoliating the substrate.

DETAILED DESCRIPTION OF THE INVENTION

Figure 1:
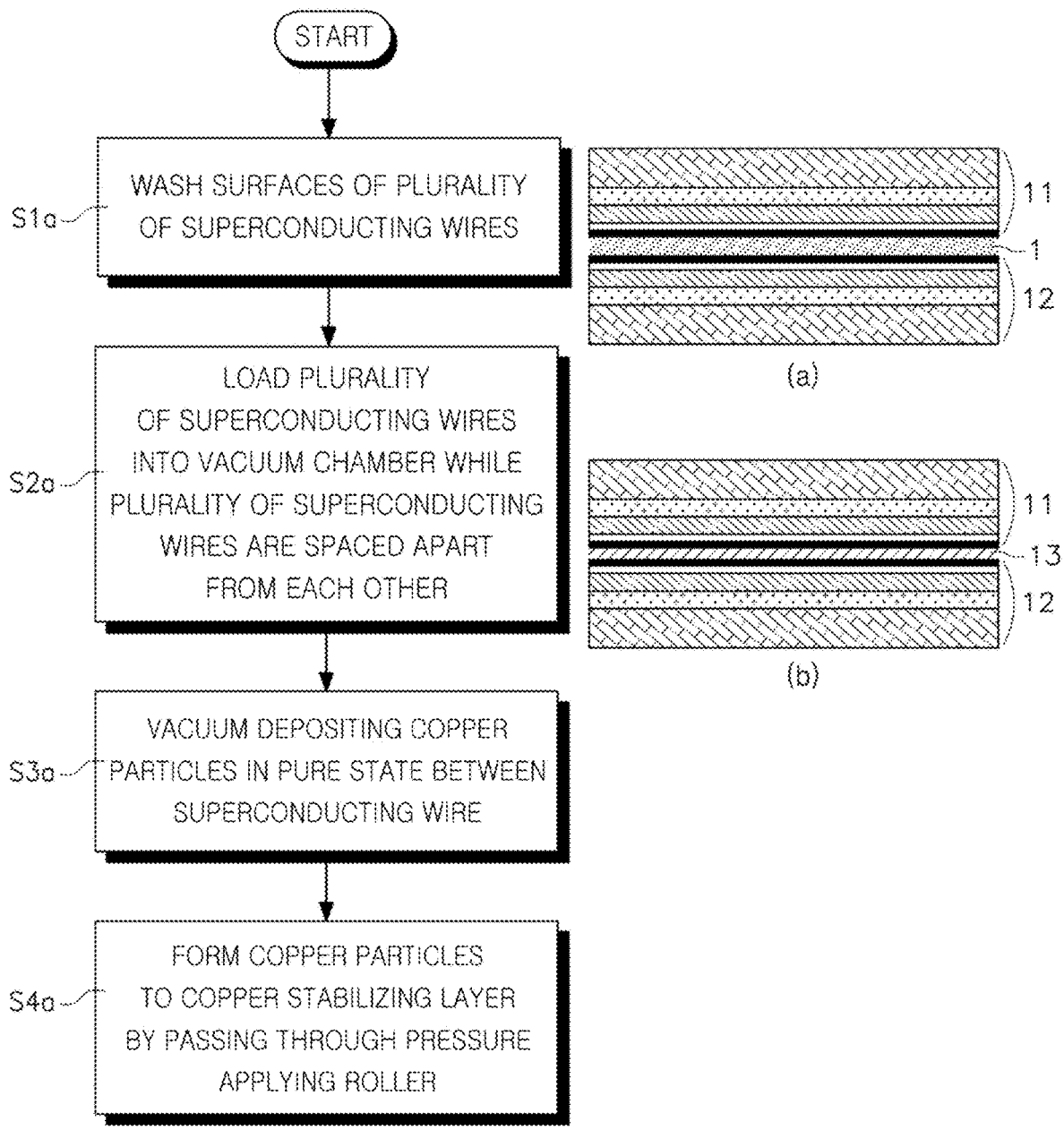
FIG. 1 is a view illustrating a process of joining superconducting wires that are stacked according to conventional technologies.
Figure 2:
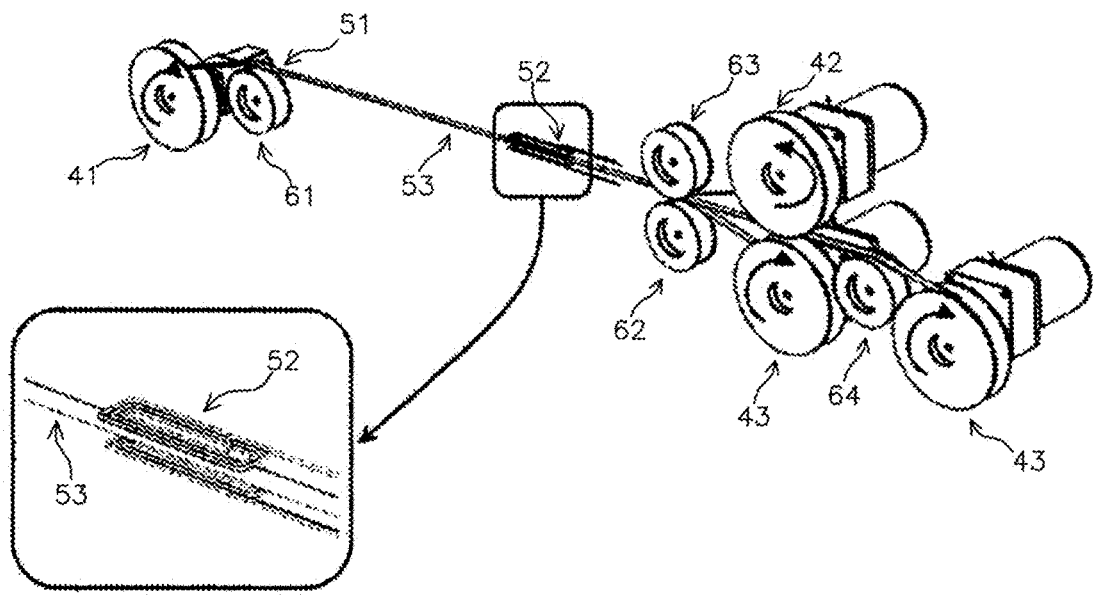
FIG. 2 is a view illustrating a reel-to-reel separation system according to conventional technologies.

Hereinafter, exemplary embodiments of the present disclosure will be described in detail with reference to the accompanying drawings. Regarding the reference numerals assigned to the elements in the drawings, it should be noted that the same elements will be designated by the same reference numerals, wherever possible, even though they are shown in different drawings. In addition, in the following description of embodiments of the present disclosure, when detailed descriptions of well-known configurations or functions are determined as interfering with understanding of the embodiments of the present disclosure, they are not described in detail. Further, when a component is described as being "provided", "stacked", "formed", or "coated" on other component, the component may be directly provided, stacked, formed, or coated on the other component. However, it should be understood that another component may be "provided", "stacked", "formed", or "coated" between the component and the other component.

A high temperature superconducting wire having multiple superconducting layers includes a main substrate, at least one buffer layer provided on an upper portion of the main substrate, at least two or more superconducting layers provided on an upper portion of the buffer layers, at least one joining protective layer provided between the superconducting layers, and an outer protective layer formed of the same material as the joining protective layers and provided on an upper portion of an outermost superconducting layer.

Meanwhile, a stacked structure as described above is a structure in which multiple superconducting layers are formed by utilizing a superconducting wire having a single layer structure, and may be formed by repeating a process of joining and exfoliating to a plurality of superconducting wires including a substrate, a superconducting layer, and a protective layer, under the atmospheric pressure.

Figure 3:
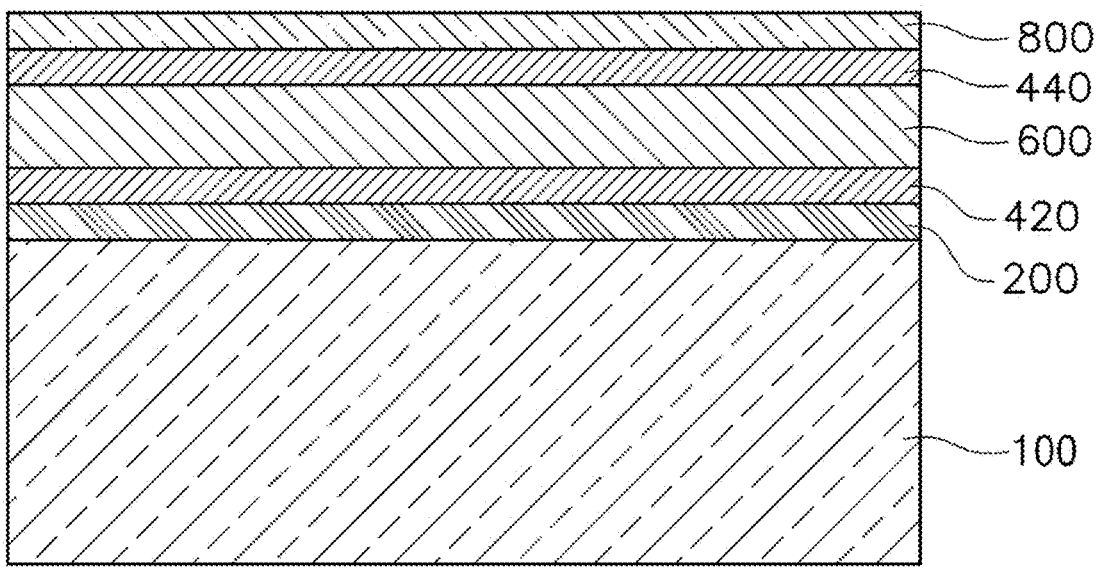
FIG. 3 is a view illustrating an embodiment of a high temperature superconducting wire having multiple superconducting layers.

In detail, a view illustrating an embodiment of the high temperature superconducting wire having the multiple superconducting layers according to the present disclosure is illustrated in FIG. 3.

Referring to the drawing, the high temperature superconducting wire having the multiple superconducting layers 900 (hereinafter, referred to as 'high temperature superconducting wire 900') according to the present disclosure includes a main substrate 100, a buffer layer 200 provided on an upper portion of the main substrate 100, a first superconducting layer 420 and a second superconducting layer 440 provided on an upper portion of the buffer layer 200, a joining protective layer 600 provided between the first and second superconducting layers 420 and 440, and an outer protective layer 800 formed of the same material as the joining protective layer 600 and provided on an upper portion of the second superconducting layer 440.

The stacked structure as described above is formed by performing the process of joining and exfoliating to one superconducting wire including the first superconducting layer 420 and another superconducting wire including the second superconducting layer 400. Further, as long as each of the superconducting wires has a structure including a substrate, a superconducting layer, and a protective layer, each of the superconducting wires can be applied regardless of a manufacturing method thereof.

Hereinafter, the present embodiment will be described by using a pair of superconducting wires that are manufactured by the same manufacturing method.

In the present embodiment, the main substrate 100 may be formed of a nickel alloy or stainless steel having oxidation resistance, but is not limited thereto.

The buffer layer 200 is formed between the main substrate 100 and the first superconducting layer 420, and serves to buffer various external stimuli.

Generally, when the superconducting wire is manufactured, the superconducting layer is formed under a high temperature condition. At this time, a metal material of a metal substrate may be diffused into the superconducting layer and the superconducting layer may be contaminated. The buffer layer 200 serves to prevent such a contamination situation as described above. Further, the buffer layer 200 serves to increase superconducting characteristics of the superconducting layer, and a plurality of buffer layers may be used as necessary.

In the present embodiment, a biaxially textured structure is applied to the buffer layer 200. Further, in the first superconducting layer 420 formed on the upper portion of the biaxially textured buffer layer 200, crystal growth occurs along the buffer layer 200. The biaxially textured buffer layer 200 having the functions as described above may be formed through a thin film manufacturing process such as IBAD, RABiTs, or ISD.

The first superconducting layer 420 is formed by vapor deposition, and has a biaxially textured structure along a crystal structure of the buffer layer 200.

The biaxially textured structure refers to a lattice structure in which a C-axis is oriented along a thickness direction and an A-B plane is oriented along a longitudinal direction. In the degree of biaxial texture, the degree of in-plane orientation ($\Delta\phi$) is $2°<\Delta\phi<10°$, and the degree of out-of-plane orientation ($\Delta\omega$) is $1°<\Delta\omega<7°$. When the biaxially textured structure as described above is applied, electro-conductivity of the first superconducting layer 420 may be increased.

The first superconducting layer 420 is formed by using a material including a flux pinning center or a material in which rare earth is mixed. Further, when the material in which rare earth elements are mixed is used, a rare earth element-barium-copper-oxygen (RE-Ba—Cu—O) based material may be applied.

For example, the first superconducting layer 420 may be formed of gadolinium-barium-copper-oxygen (GdBCO), samarium-barium-copper-oxygen (SmBCO), europium-barium-copper-oxygen (EuBCO), yttrium-barium-copper-oxygen (YBCO), holmium-barium-copper-oxygen (HoBCO), and a mixture thereof. In some cases, the first superconducting layer 420 may be formed in a structure in which a plurality of $Re_2O_3$ oxides exists.

Meanwhile, the stacked structure as described above may also be formed in the same manner to the superconducting wire including the second superconducting layer 440, and protective layers (not illustrated in FIG. 3) are respectively formed on the first superconducting layer 420 and the second superconducting layer 440 of each of the superconducting wires.

The protective layers are thinly coated on upper surfaces of the first and second superconducting layers 420 and 440, and serve to protect the first and second superconducting layers 420 and 440 from external conditions.

The protective layers do not react in contact with the superconducting layers, and the protective layers serve to prevent separation and deterioration of the superconducting layers. Further, a noble metal that does not oxidize even if the noble metal is heated in air may be applied to the protective layers.

Here, the noble metal may be selected from a group consisting of silver (Ag), gold (Au), platinum (Pt), palladium (Pd), ruthenium (Ru), rhodium (Rh), iridium (Ir), osmium (Os), rhenium (Re), and a mixture thereof, but is not limited thereto.

In the present embodiment, silver (Ag) is applied as the protective layers, and the thickness of the protective layers may be formed in a range of 0.5 μm to 10 μm. When the thickness of the protective layers is less than 0.5 μm, the superconducting layer cannot be properly protected. When the thickness of the protective layers exceeds 10 μm, the thickness of the protective layers is too thick, thereby increasing overall thickness of the superconducting wire. Therefore, the thickness of the protective layers is formed within the range as described above.

Meanwhile, the superconducting wires in which the protective layers are formed as described above independently exist, and are stacked to each other while the joining protective layer 600 that is a main configuration of the present disclosure is formed.

The joining protective layer 600 is a structure for forming a multi-layer structure by joining the first superconducting layer 420 and the second superconducting layer 440 together, and is formed by stacking the first and second superconducting layers 420 and 440 such that the protective layer of the upper portion of the first superconducting layer 420 and the protective layer of the upper portion of the second superconducting layer 440 are facing each other and by performing thermal treatment.

As described above, the protective layers are formed by thinly coating silver (Ag). Further, since the protective layers are formed of the noble metal, when the protective layers are stacked together and thermally treated in a metal state in which oxidation does not occur on surfaces thereof, the protective layers are joined together by diffusion and an interface between the protective layers are removed and the joining protective layer 600 is formed.

That is, the joining protective layer 600 is a configuration for joining a space between the superconducting layers of the superconducting wires that are separately formed by performing the thermal treatment in air. Further, since the joining protective layer 600 is formed of the noble metal, the joining protective layer 600 does not oxidize when the thermal treatment is performed, and the formation of the joining protective layer 600 can be repeatedly performed since the joining protective layer 600 is formed by diffusion joining without a biaxially textured crystal.

When the first and second superconducting layers 420 and 440 are joined by the joining protective layer 600 as described above, the stacked structure including the main substrate 100, the buffer layer 200, the first superconducting layer 420, the joining protective layer 600, the second superconducting layer 400, the buffer layer (not illustrated) of the second superconducting layer, and the substrate (not illustrated) of the second superconducting layer is formed.

In this manner, when the stacked structure is formed, the buffer layer of the second superconducting layer 440 formed on the upper portion of the second superconducting layer 440 and the substrate of the second superconducting layer 440 are removed. Accordingly, the outer protective layer is formed on the upper portion of the second superconducting layer 440 that is exposed to the outside.

The outer protective layer 800 is formed of the same material as the joining protective layer 600. Further, when a third superconducting wire including a third superconducting layer is stacked, the outer protective layer 800 is joined together with a protective layer of the third superconducting wire and is thermally treated, and a second joining protective layer connecting the second superconducting layer 440 to the third superconducting layer that is added is formed.

In addition, when a superconducting layer is to be stacked N times on an upper portion of the third superconducting layer, N joining protective layers and N superconducting layers are repeatedly configured in the same manner as the second joining protective layer, and the outer protective layer 800 as described above is formed on an upper portion of a 3+N-th superconducting layer (here, N is a natural number).

That is, when a superconducting layer is to be additionally stacked according to the required current density, the outer protective layer 800 forms a joining protective layer by diffusion joining to a protective layer of an additionally stacked superconducting wire. Further, when an additional stacking is not performed, mechanical properties may be increased by further adding a metal coating layer or a metal substrate on the outer protective layer 800.

Hereinafter, a more detailed manufacturing process of the high temperature superconducting wire having the multi superconducting layers that are having the stacked structure as described above will be described.

Figure 4:
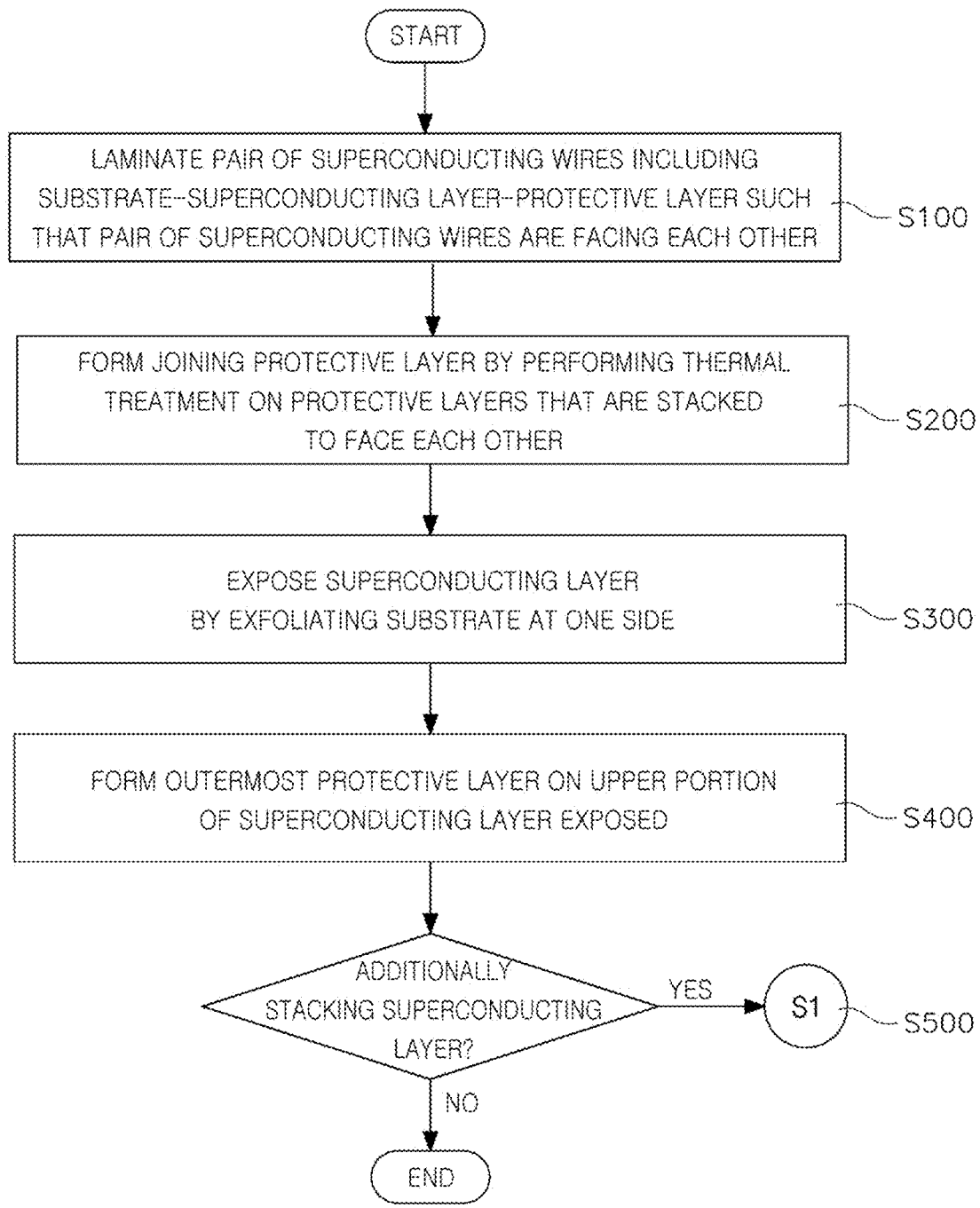
FIG. 4 is a flowchart illustrating a manufacturing process of the high temperature superconducting wire according to the present disclosure.
Figure 5:
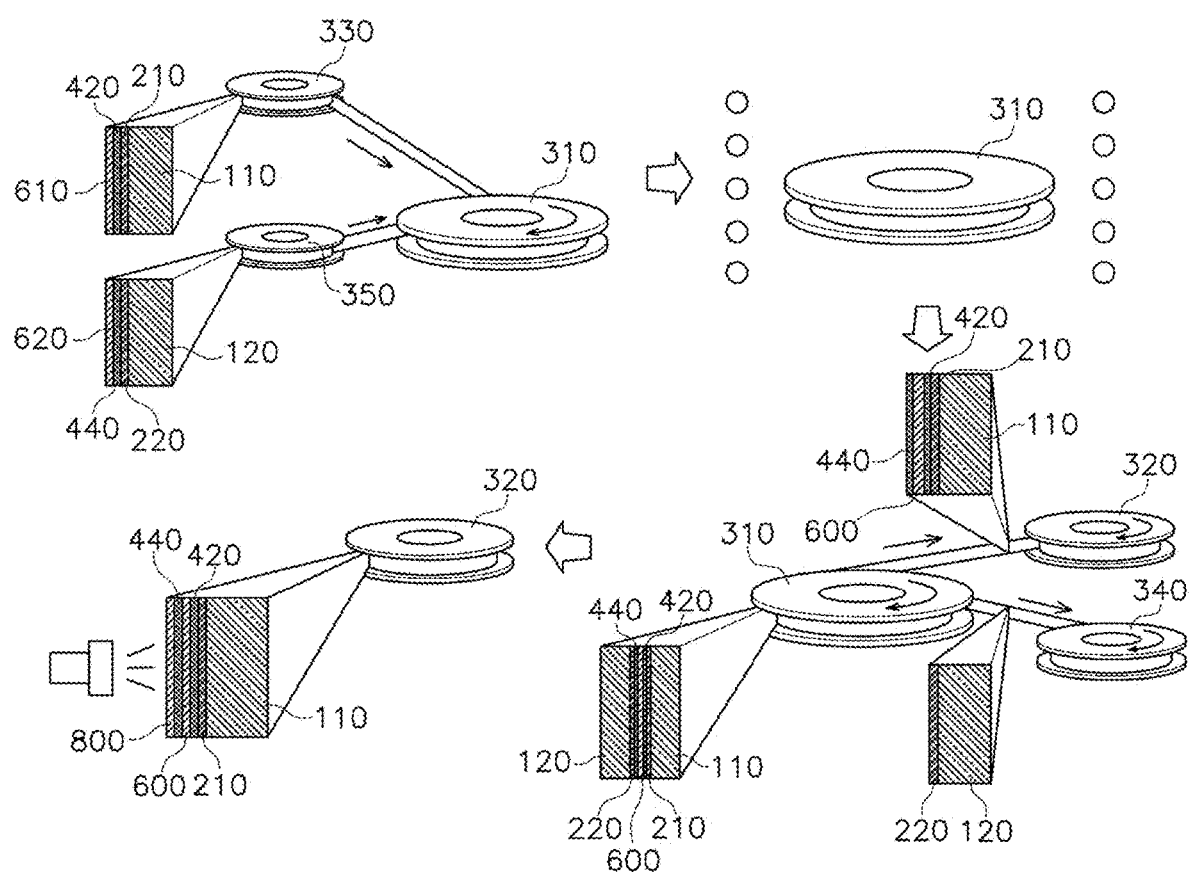
FIG. 5 is a view illustrating the manufacturing process at each step according to FIG. 4.
Figure 6:
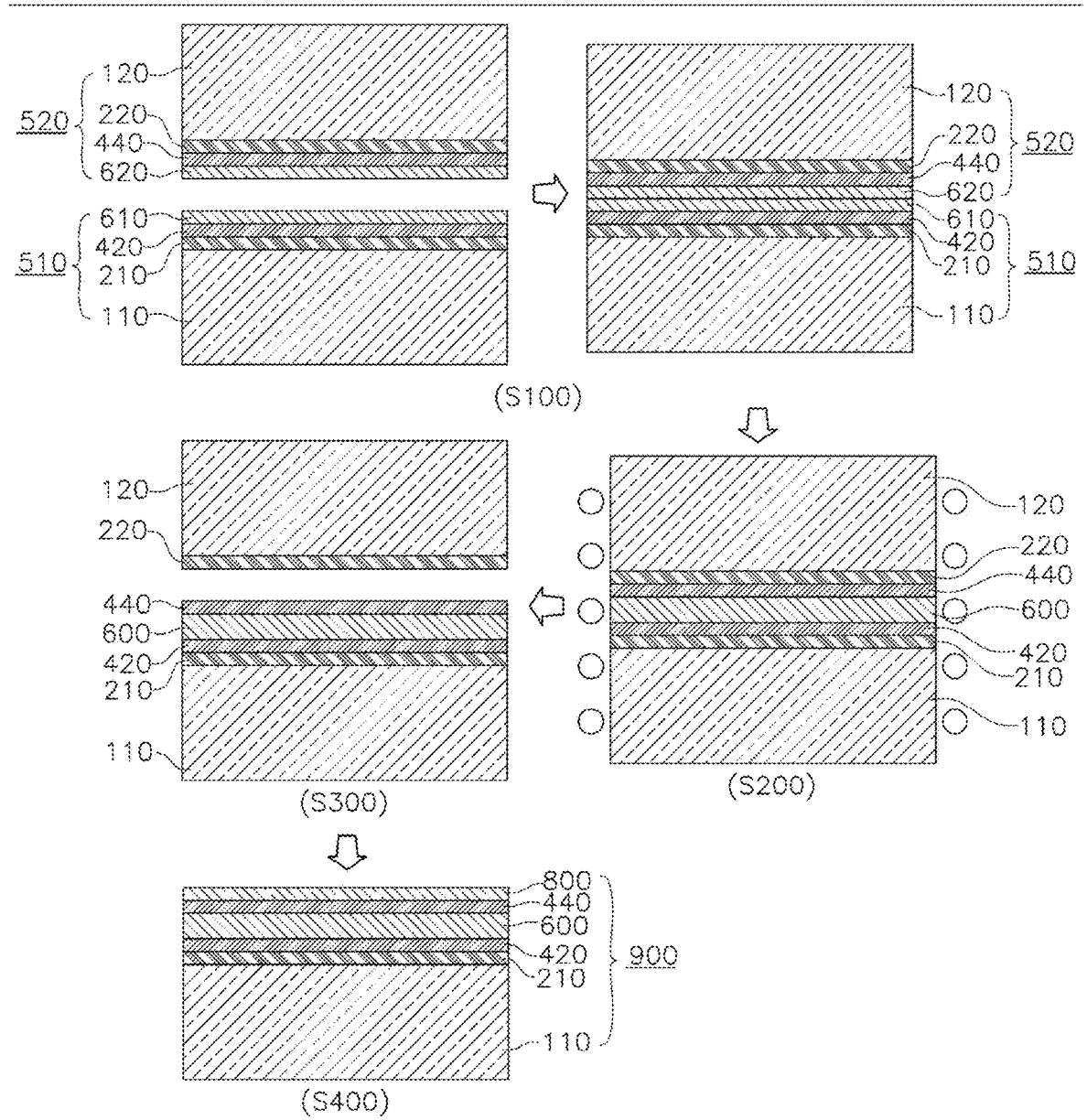
FIG. 6 is a cross-sectional view illustrating a stacked structure at each step according to FIG. 4.

FIG. 4 is a flowchart illustrating a manufacturing process of the high temperature superconducting wire according to the present disclosure, FIG. 5 is a view illustrating the manufacturing process at each step according to FIG. 4, and FIG. 6 is a cross-sectional view illustrating a stacked structure at each step according to FIG. 4.

Referring to the drawings, the manufacturing process of the high temperature superconducting wire 900 according to the present disclosure is realized by using the plurality of superconducting wires including the substrate, the superconducting layer, and the protective layer. Hereinafter, for convenience of the description, the order is given to the superconducting wires, and an N-th superconducting wire, such as a first superconducting wire 510, a second superconducting wire 520, an N-th super conducting wire will be described by giving the N-th superconducting wire sequentially (here, N is a natural number equal to or greater than 3).

In detail, in the manufacturing method of the high temperature superconducting wire 900 according to the present disclosure, a stacking process S100 in which the first superconducting wire 510 formed of a first substrate 110, a first buffer layer 210, the first superconducting layer 420, a first protective layer 610 and the second superconducting wire 520 formed of a second substrate 120, a second buffer layer 220, the second superconducting layer 440, and a second protective layer 620 are prepared and the first protective layer 610 and the second protective layer 620 are stacked is performed.

For easier and more efficient stacking, in the present embodiment, the first and second superconducting wires 510 and 520 are prepared by being wound on a first supply reel 330 and a second supply reel 350 respectively. Further, when the preparation is completed, the stacking process S100 in which the first and second superconducting wires 510 and 520 are stacked such that the first protective layer 610 and the second protective layer 620 are facing each other is performed.

In the stacking process S100, by using a winding bobbin 310, the first and second protective layers 610 and 620 of the first and second superconducting wires 510 and 520 that are supplied from the first supply reel 330 and the second supply reel 350 are wound in a pancake shape on the winding bobbin 310 such that the first and second protective layers 610 and 620 are facing each other and are stacked.

When the first and second protective layers 610 and 620 are stacked in the pancake shape by using the winding bobbin 310, it is possible to perform the stacking while a constant tension is applied. Therefore, the first and second protective layers 610 and 620 may be more closely in contact with each other.

Meanwhile, after the stacking process S100 is performed as described above, a joining process S200 in which the stacked first and second superconducting wires 510 and 520 are thermally treated and the joining protective layer 600 is formed is performed.

In the joining process S200, the thermal treatment is performed while the first and second superconducting wires 510 and 520 are wound on the winding bobbin 310. Here, since the first and second protective layers 610 and 620 are formed of a thin film coated with silver (Ag), surfaces of the first and second protective layers 610 and 620 do not oxidize even if the surfaces are exposed to air.

Therefore, the winding bobbin 310 can be thermally treated by using a heating mechanism without a separate vacuum chamber, and the thermally treated first and second protective layers 610 and 620 are diffusion joined and form one joining protective layer 600 in which an interface does not exist.

Meanwhile, in the joining process S200, the thermal treatment is performed within a temperature range of at least 400° C. to less than 600° C.

When the thermal treatment is performed within a temperature range of less than 400° C., diffusion joining between the first and second protective layers 610 and 620 does not completely occur, which makes it difficult to form the joining protective layer 600. Further, when the thermal treatment is performed within a temperature range that exceeds 600° C., the first and second superconducting layers 420 and 440 may lose the superconducting characteristics. Therefore, in the joining process S200, the thermal treatment is performed within the temperature range as described above so that plastic deformation does not occur and joining is realized by using diffusion of atoms.

When the joining process S200 is completed, one superconducting wire formed in the stacked structure including the first substrate 110, the first buffer layer 210, the first superconducting layer 420, the joining protective layer 600, the second superconducting layer 440, the second buffer layer 220, and the second substrate 120 is formed in a state wound on the winding bobbin 310.

Meanwhile, in the present disclosure, an exfoliating process S300 for additionally stacking a superconducting layer is performed in a state as described above.

In detail, the exfoliating process S300 is a preparation process for additionally stacking the superconducting layer by additionally forming the joining protective layer 600 as described above. Further, in the present embodiment, the second substrate 120 and the second buffer layer 220 are exfoliated from the second superconducting wire 520 while only the second superconducting layer 440 is left.

In the exfoliating process S300 according to the present disclosure, a separation method in which the superconducting layer is exfoliated by applying physical force in air is applied.

In detail, in the stacked structure formed through the joining process S200, when a coupling structure between each layer is checked, a structure in which the joining protective layer 600 formed of the noble metal is coupled to the superconducting layer formed of ceramic has a relatively strong coupling force, but a structure in which the buffer layer formed of ceramic is coupled to the superconducting layer formed of ceramic has a relatively weak coupling force.

Therefore, when the second substrate 120 is exfoliated by applying physical force, the joining protective layer 600 and the second superconducting layer 440 that are having the relatively strong coupling force maintain a firmly coupled state, and the second buffer layer 220 and the second substrate 120 that are having the relatively weak coupling force are exfoliated from the second superconducting layer 440.

Meanwhile, in the present disclosure, the exfoliating process S300 is performed by using the winding bobbin 310, a wire collection reel 320, and a substrate collection reel 340.

The second substrate 120 of the stacked wire supplied from the winding bobbin 310 is fixed on the substrate collection reel 340 and the substrate collection reel 340 is rotated, and the substrate collection reel 340 collects the second buffer layer 220 exfoliated from the second superconducting layer 440 and the second substrate 120 that is coupled to the second buffer layer 220.

The wire collection reel 320 collects the wire of the stacked structure including the first substrate 110, the first superconducting layer 420, the joining protective layer 600, and the second superconducting layer 440 which remains while the second substrate 120 is collected as described above.

At this time, in the joining process S200, an end portion of the second substrate 120 is joined such that the end portion of the second substrate 120 protrudes outward compared to outer layers in order for more easily collecting the second substrate 120. Further, in the exfoliating process S300, the protruded second substrate 120 is fixed on the substrate collection reel 340 and rotated, so that the exfoliating may be more easily performed.

Meanwhile, on the metal substrate for manufacturing the superconducting thin film wire, an electropolish process for performing a planarization of a substrate is performed during the manufacturing process. At this time, due to an electric field concentrated on a corner portion of the metal substrate, the corner of the metal substrate may be formed to be rounded when etching is largely performed on the corner portion.

In addition, in the superconducting wire manufactured by using the substrate as described above, when the exfoliating is performed by applying physical force, a situation in which exfoliating of the superconducting layer is not properly performed on the corner portion of the superconducting layer may occur.

Figure 7:
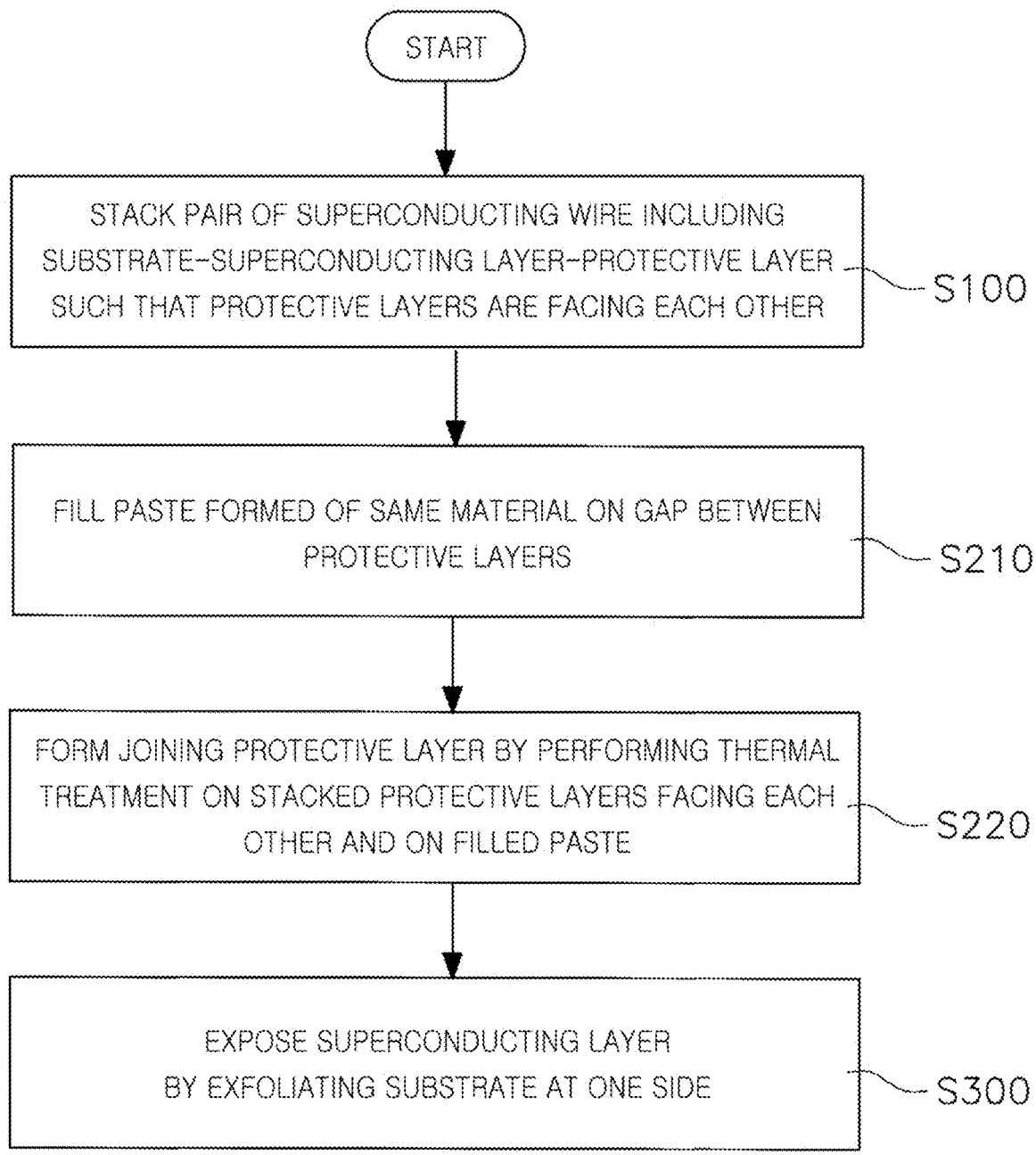
FIG. 7 is a flowchart illustrating another embodiment of a joining process that is a main configuration of the present disclosure.
Figure 8:
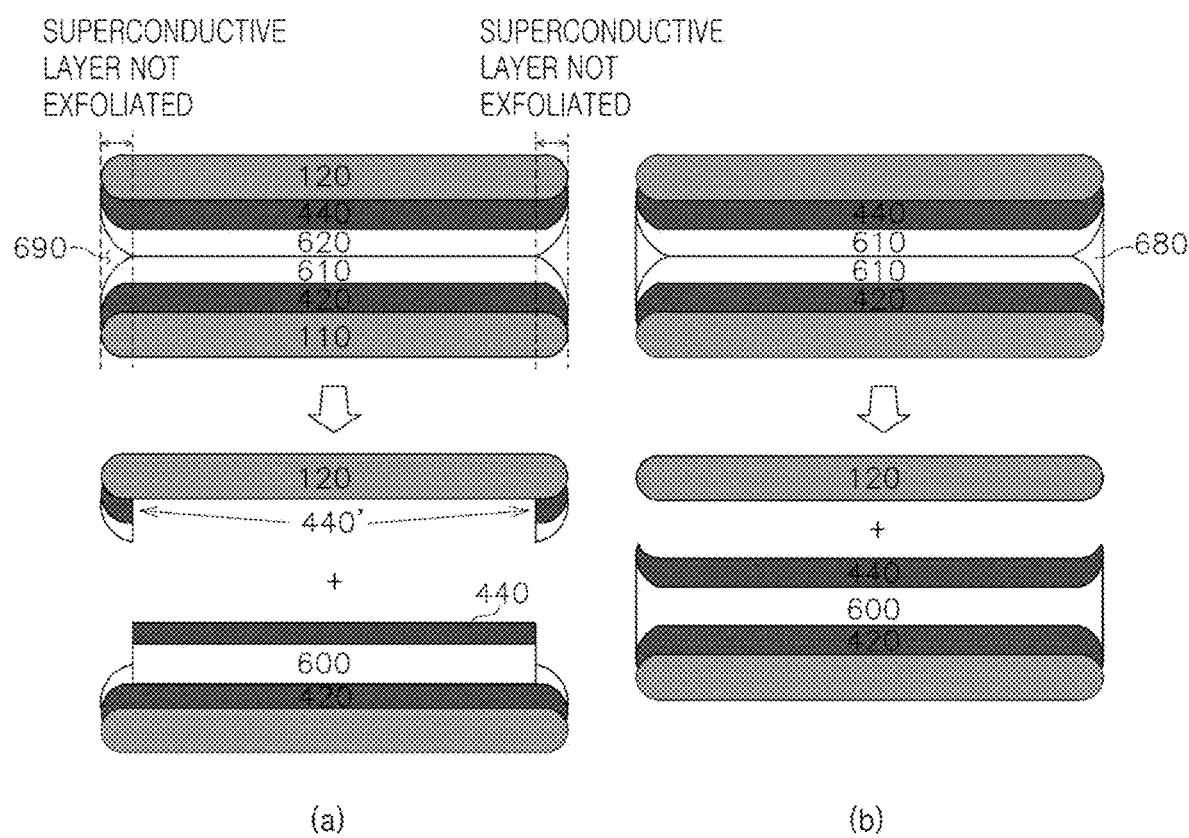
FIG. 8 is a view illustrating a difference in exfoliating of a substrate according to another embodiment in FIG. 7.
Figure 9:
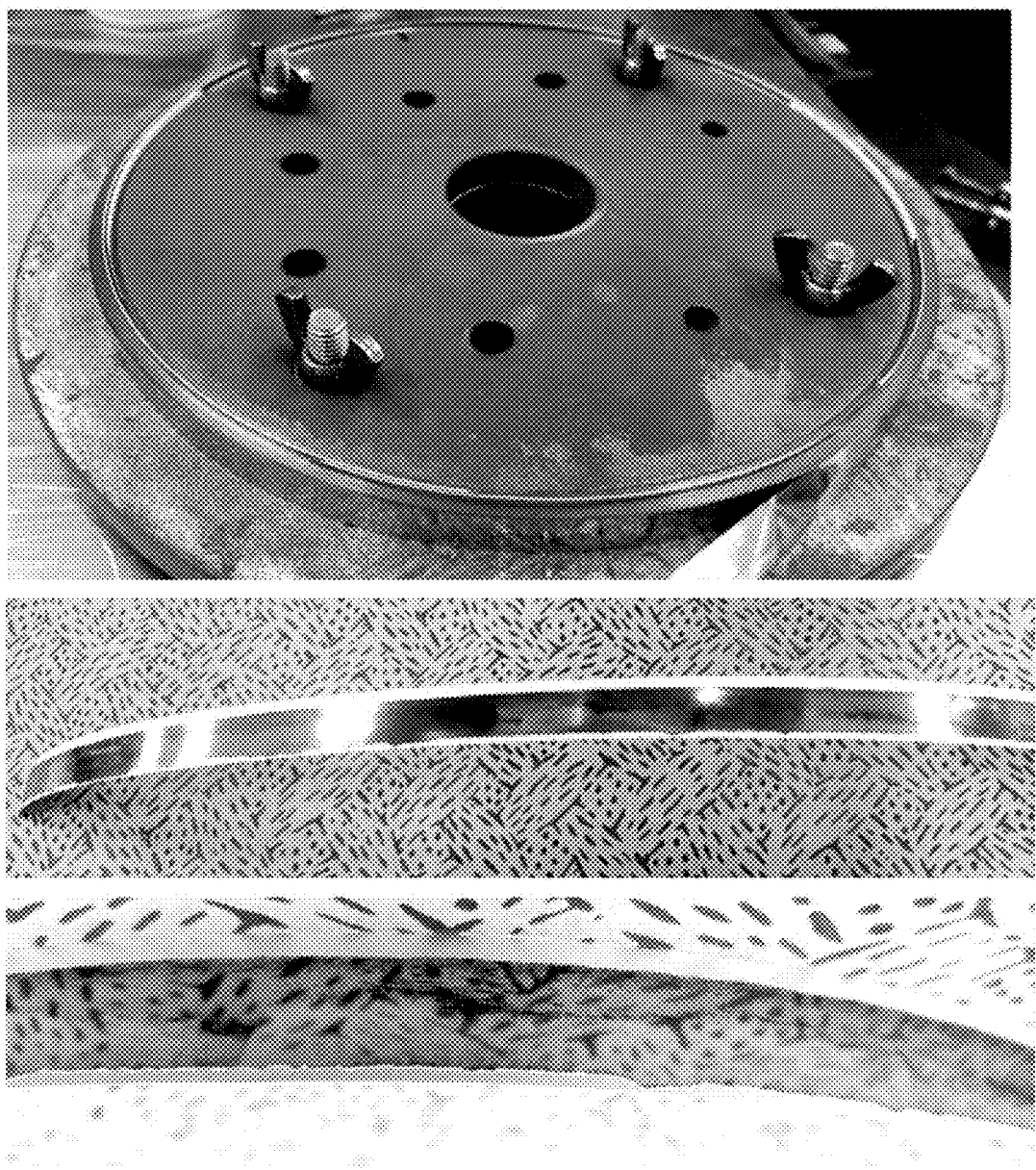
FIG. 9 is a photograph illustrating a state in which the substrate is exfoliated by using a winding bobbin.

In detail, FIG. 7 is a flowchart illustrating another embodiment of a joining process that is a main configuration of the present disclosure, FIG. 8 is a view illustrating a difference in exfoliating of a substrate according to another embodiment in FIG. 7, and FIG. 9 is a photograph illustrating a state in which the substrate is exfoliated by using the winding bobbin.

At first, referring to FIG. 8, the first and second superconducting layers 420 and 440 and the first and second protective layers 610 and 620 that are respectively formed on the upper portions of the first and second substrates 110 and 120 that are having the rounded corner are formed to be rounded along the corner shape of the first and second substrates 110 and 120.

Therefore, when the first protective layer 610 and the second protective layer 620 are stacked in the shape as described above, a gap 690 is formed on corners of the first protective layer 610 and the second protective layer 620.

The gap 690 exists even after the joining protective layer 600 is formed. Further, in this state, when the second substrate 120 is pulled by using physical force, a residual superconducting layer 440' also remains on the second substrate 120 that is exfoliated as in a left side of the FIG. 8, and a loss occurs.

Therefore, in order to solve such a loss, a paste filling process S210 in which the gap 690 is filled with a paste 680 formed of the same material as the first and second protective layers 610 and 620 may further be performed.

The paste filling process S210 is performed by wounding and the first and second protective layers 610 and 620 in the pancake shape through the stacking process S100 such that the first and second protective layers 610 and 620 are facing each other and by filling the paste 680 formed of the same material as the first and second protective layers 610 and 620 on the gap 690.

When the paste filling process S210 is completed as described above, the thermal treatment is performed as the same as the joining process S200 that is described above. At this time, a joining protective layer forming process S220 in which the paste 680 filled on a region corresponding to the gap 690 and the interface between the first and second protective layers 610 and 620 are diffusion joined together and one joining protective layer 600 is formed is performed.

When the second substrate 120 is exfoliated after the region corresponding to the gap 690 is also formed as one layer, the exfoliating of the second substrate 120 is effectively performed without the loss of the second superconducting layer 440 as in a right side of FIG. 8, which can be confirmed through the photograph of the cleanly exfoliated substrate illustrated in FIG. 9.

Meanwhile, when the exfoliating process S300 is performed, the second superconducting layers 440 are exposed to the outside. Further, on the upper portion of the second superconducting layer 440 that is exposed as described above, an outer protective layer forming process S400 is performed so that an additional stacking of the superconducting wire or a stacking for reinforcing mechanical properties is performed.

In the outer protective layer forming process S400, the outer protective layer 800 is formed by thinly coating the upper surface of the outermost superconducting layer exposed to the outside with the same material as the joining protective layer 600.

When the formation of the outer protective layer 800 is completed as described above, the high temperature superconducting wire 900 formed of the first substrate 110, the first buffer layer 210, the first superconducting layer 420, the joining protective layer 600, the second superconducting layer 440, and the outer protective layer 800 is formed.

Meanwhile, on the high temperature superconducting wire 900 formed as described above, the superconducting layer may be additionally stacked as described above. However, when the additional stacking is not performed, the outer protective layer 800 forms the outermost protective layer, and a stabilizing layer forming process for reinforcing mechanical properties is performed.

That is, according to the present disclosure, the high temperature superconducting wire 900 may be provided by repeatedly stacking the superconducting layers according to a current density required in the application fields. Further, when the requirement condition of the current density is satisfied, the mechanical properties are reinforced by forming the metal coating layer such as a copper stabilizing layer.

Hereinafter, an additional stacking process S500 for additionally stacking the superconducting layer on the high temperature superconducting wire 900 will be described.

Figure 10:
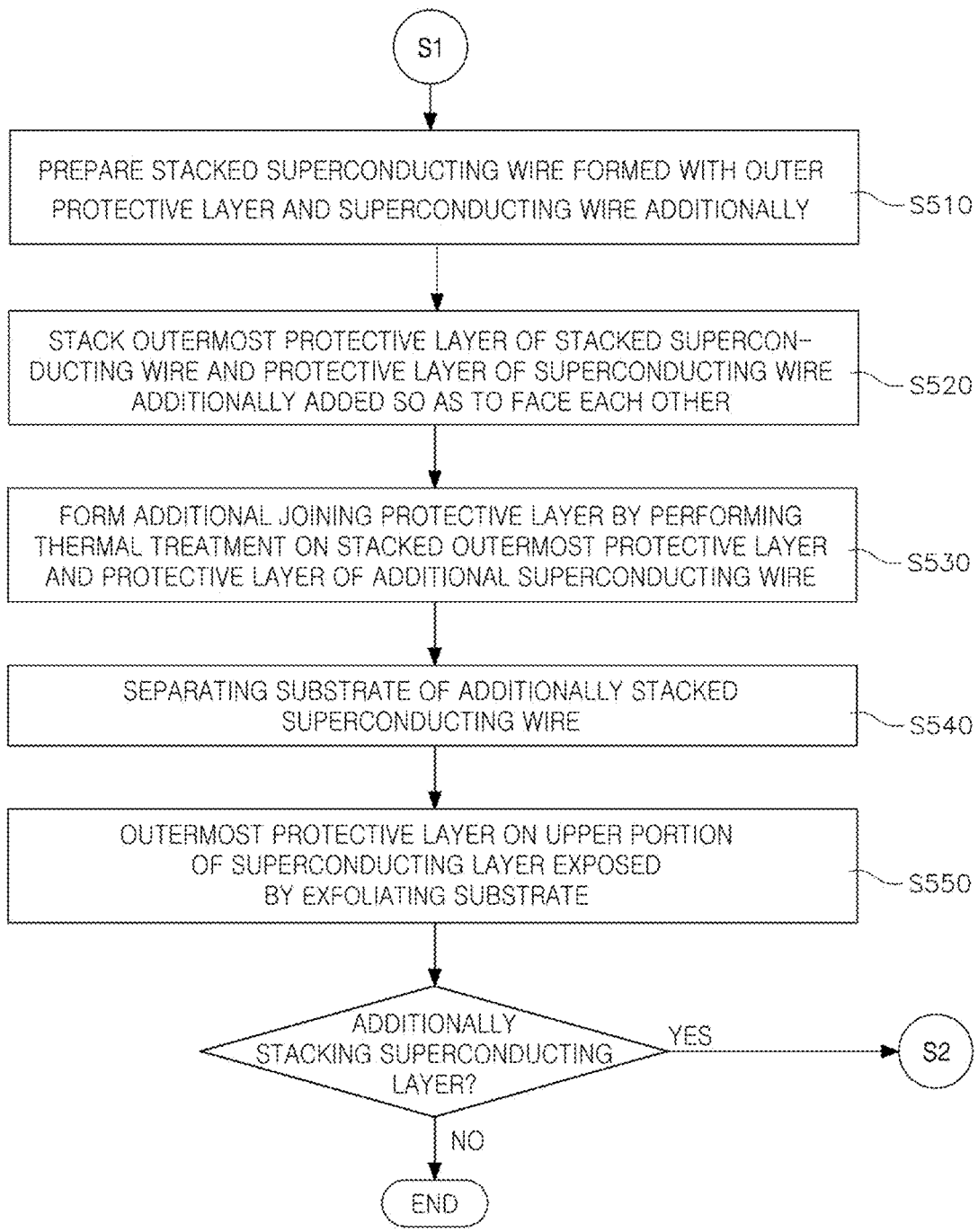
FIG. 10 is a flowchart illustrating an additional stacking process of the high temperature superconducting wire according to the present disclosure.
Figure 11:
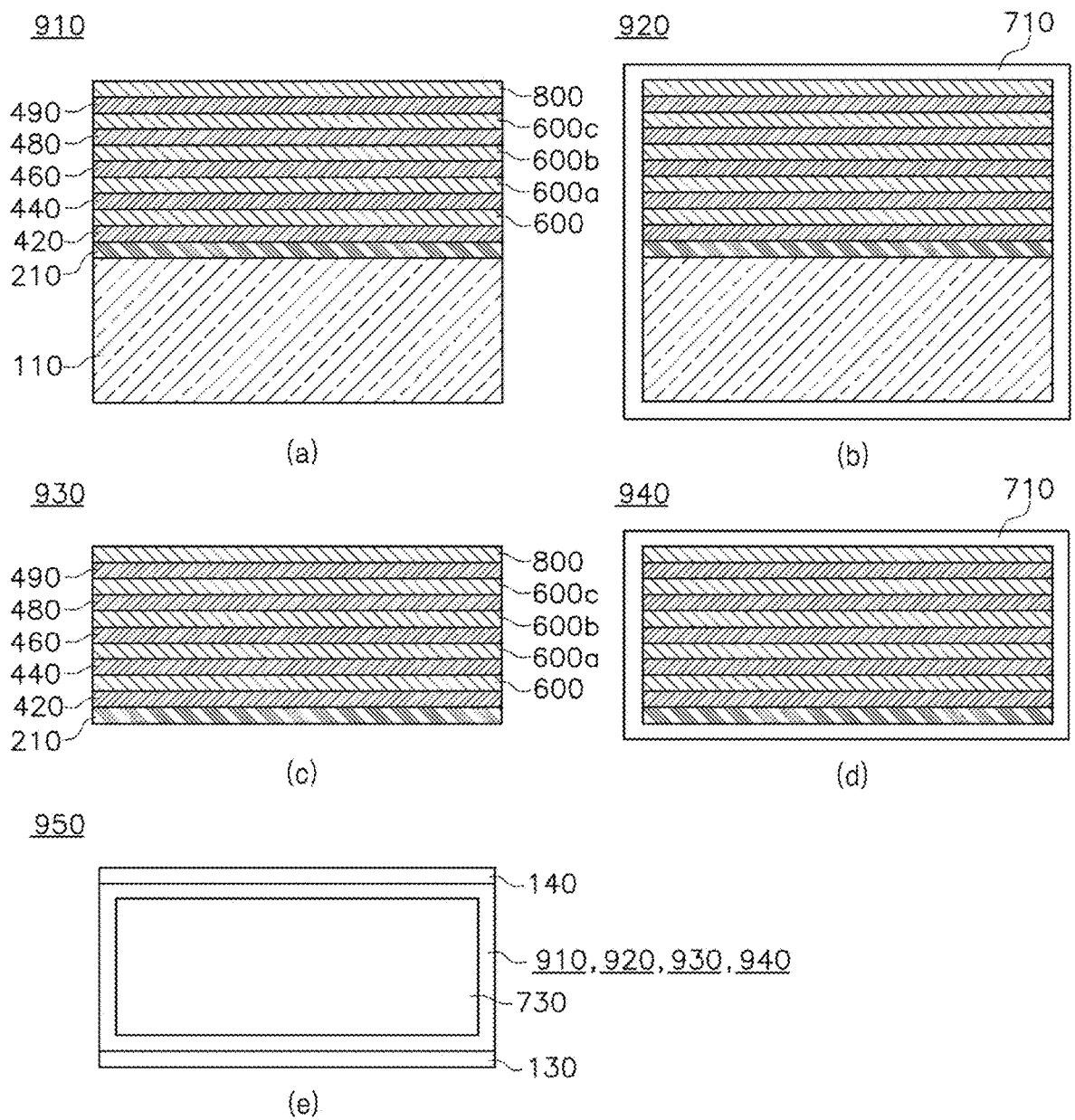
FIG. 11 is a cross-sectional view illustrating various embodiments of the high temperature superconducting wire according to the present disclosure.

FIG. 10 is a flowchart illustrating an additional stacking process of the high temperature superconducting wire according to the present disclosure, and FIG. 11 is a cross-sectional view illustrating various embodiments of the high temperature superconducting wire according to the present disclosure.

Referring to the drawings, when an additional superconducting layer is to be stacked on the high temperature superconducting wire 900 that is manufactured through the process S100 to the process S400 as described above, a preparing process S510 in which the superconducting wire that is additionally stacked and the high temperature superconducting wire 900 including the first and second superconducting layers 420 and 440 and the outer protective layer 800 are prepared is performed.

In the preparing process S510, the preparation is performed such that the high temperature superconducting wire 900 is supplied through one supply reel and the superconducting wire that is additionally stacked is supplied through another supply reel.

When the preparing process S510 is completed, the high temperature superconducting wire 900 and the superconducting wire that is additionally stacked is wound and stacked in the pancake shape on the winding bobbin 310. At this time, an additional stacking process S520 in which the outer protective layer 800 and a protective layer (not illustrated) of the superconducting layer that is additionally stacked are stacked while facing each other is performed.

When the additional stacking process S520 is completed, an additional joining protective layer forming process S530 performed through the thermal treatment is performed. At this time, the paste filling process S210 and the joining protective layer forming process S220 that are described above may be added before the additional joining protective layer forming process S530.

Meanwhile, when the additional joining protective layer forming process S530 is completed, another exfoliating process S540 in which a layered structure of the upper layer of the superconducting layer is exfoliated and the substrate of the additionally stacked superconducting wire is exfoliated is performed. Further, on the upper portion of the additionally stacked superconducting layer exposed to the outside, a process S550 in which the outer protective layer 800 is formed again is performed, and a high temperature superconducting layer having a three-layer structure is formed.

Figure 12:
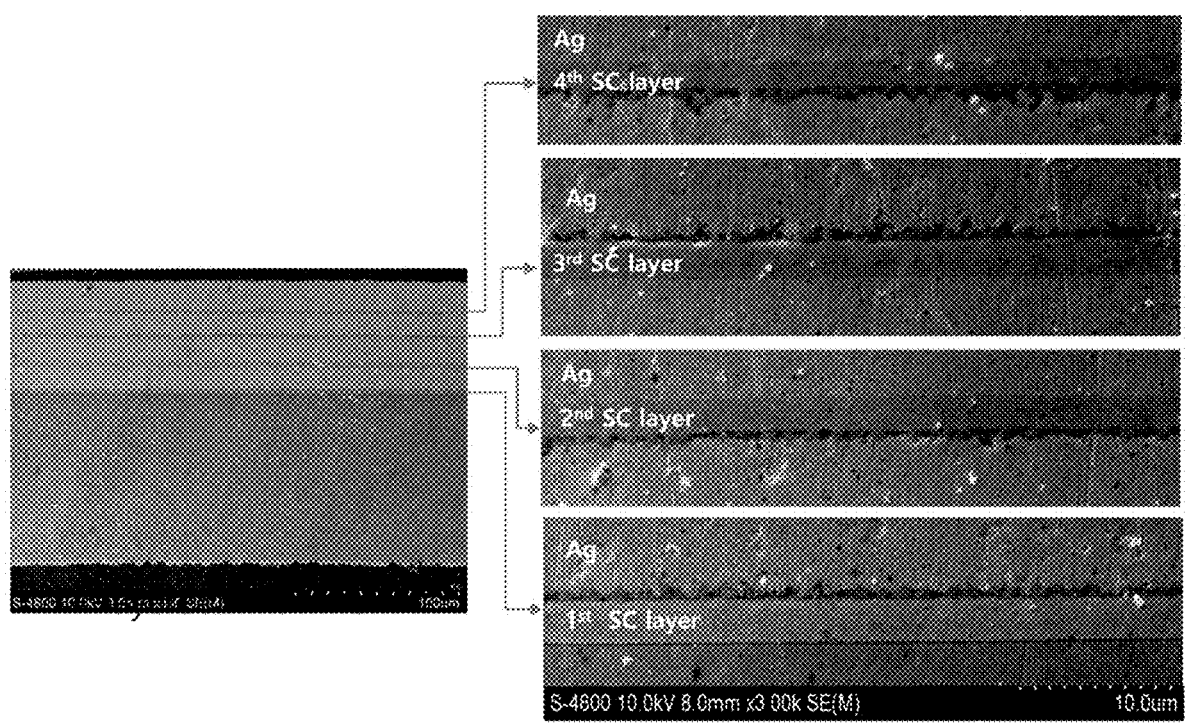
FIG. 12 is a scanning electron microscope (SEM) photograph illustrating a quadruple stacked structure and an interface that are formed by a high temperature superconducting wire manufacturing method according to the present disclosure.

In addition, the process S510 to the process S550 can be repeatedly performed according to a current density required in the application fields, and may be realized in various embodiments illustrated in FIG. 11 and FIG. 12.

Another high temperature superconducting wire 910 illustrated in FIG. 11A has a structure in which an additional stacking process S600 is performed three times, and is formed in a structure including the first substrate 110, the first buffer layer 210, the first superconducting layer 420, the joining protective layer 600, the second superconducting layer 440, another joining protective layer 600a, a third superconducting layer 460, still another joining protective layer 600b, a fourth superconducting layer 480, yet another joining protective layer 600c, a fifth superconducting layer 490, and the outer protective layer 800.

In addition, after the multiple structure of the superconducting layers are formed as described above, the multiple structure may be formed of still another high temperature superconducting wire 920 including a metal coating layer 710 as described in FIG. 11B. Here, copper, bronze, brass, stainless steel, or the like may be used as a metal in the metal coating layer 710.

Meanwhile, yet another high temperature superconducting wire 930 illustrated in FIG. 11C is formed by removing the first substrate 110 from another high temperature superconducting wire 910 illustrated in FIG. 11A. Further, in FIG. 11D, a structure in which another metal coating layer 720 is included in yet another high temperature superconducting wire 930 is formed, and structures as described above may be appropriately used according to the application fields.

In addition, in FIG. 11E, a soldering 730 and additional metal substrates 130 and 140 are added on an outer surface of each of the high temperature superconducting wires 910, 920, 930, and 940. In this structure, yet another high temperature superconducting wire 950 in which mechanical properties are increased may be formed.

Hereinafter, the high temperature superconducting wire manufactured through the process as described above will be described in detail.

Embodiment

A pair of 12 mmw superconducting wires each of which is formed of a metal substrate, a buffer layer, a superconducting layer, and a protective layer and in which the protective layer is formed by coating of silver (Ag) are prepared.

The prepared superconducting wires are wound on a circular Inconel bobbin, which is a winding bobbin, so that respective silver protective layers face each other.

At this time, a dummy wire is co-wound, and the dummy wire is wound using a 0.05 t×10 mmw LMO-coated Hastelloy wire.

As a winding method, the dummy wire is wound by about 10 turns at ≈3 kgf, and then the pair of superconducting wires are stacked so that the protective layers face each other, and then the dummy wire is co-wound. At this time, the dummy wire is additionally wound by about 30 turns to prevent unwinding.

The wound superconducting wires are subjected to oxygen thermal treatment for 3 hours at 500° C. and taken out, whereby the stacked protective layers are joined together by diffusion into a single layer in which no interface exists.

Thereafter, when the superconducting wires are exfoliated from each other in response to the application of physical force, the superconducting layer and the buffer layer, which form a relatively weak bond therebetween, are exfoliated because the protective layers are joined into the single layer, and thus a superconducting wire formed of the metal substrate, the buffer layer, the superconducting layer, the protective layer, and the superconducting layer and a wire formed of the metal substrate and the buffer layer are exfoliated from each other.

Then, a silver protective layer is coated on an upper portion of the superconducting wire having the superconducting layer exposed, the superconducting wire is then repeatedly subjected to winding on bobbins and thermal treatment together with another superconducting wire to join protective layers into the single layer, and the wire formed of the metal substrate and the buffer layer is exfoliated from the superconducting wire. Finally, a superconducting wire in which superconducting layers are repeatedly stacked may be obtained.

FIG. 12 is a scanning electron microscope (SEM) photograph illustrating a quadruple stacked structure and an interface that are formed by a high temperature superconducting wire manufacturing method according to the present disclosure, and it can be seen that the superconducting layer and the joining protective layer (illustrated as Ag in FIG. 12) are not separated from each other and are firmly stacked.

Figure 13:
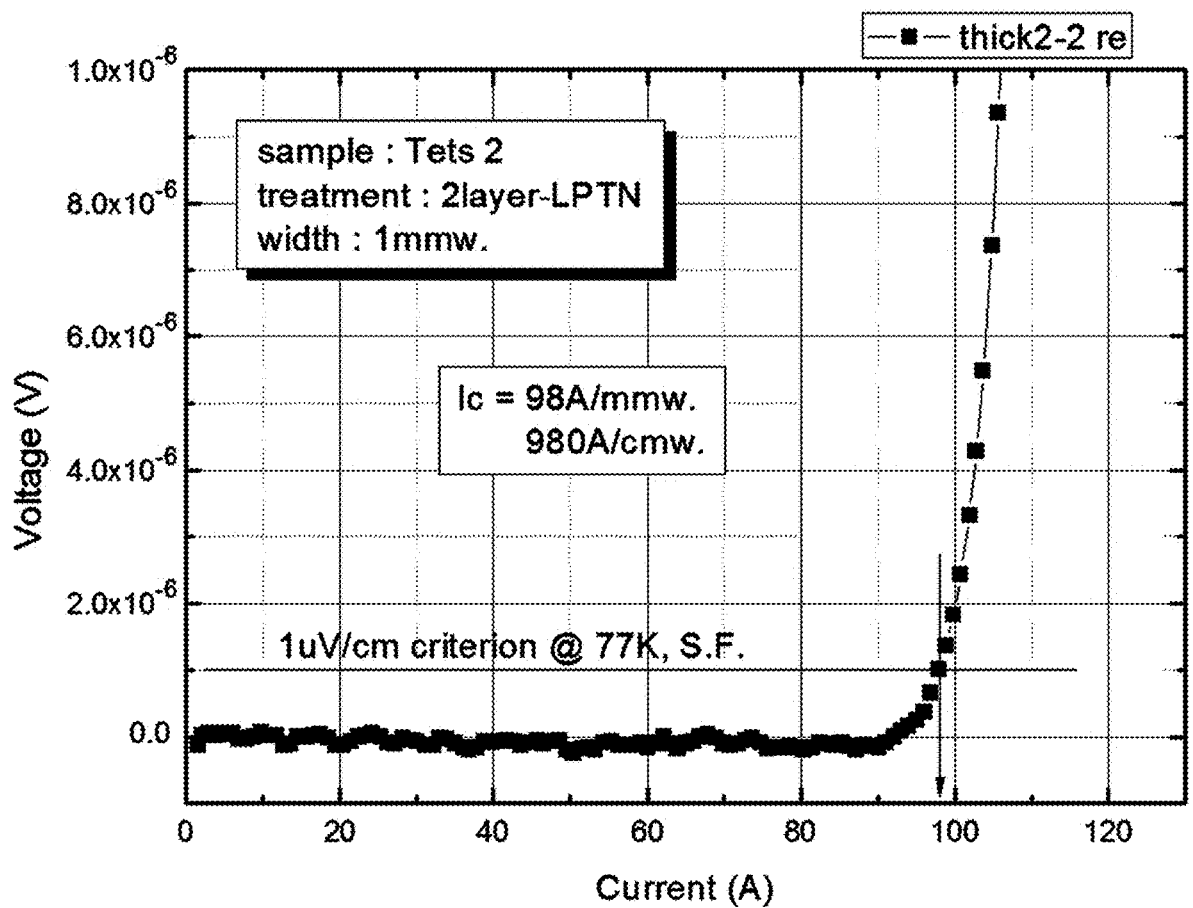
FIG. 13 is a graph illustrating a critical current measurement result of the high temperature superconducting wire according to the present disclosure.

In addition, FIG. 13 is a graph illustrating critical current measurement results of the high temperature superconducting wire having the multiple superconducting layers according to the present disclosure, and it can be seen that the measured width of a superconducting wire is 1 mm, but when the measured width is converted into a width of 10 mm, a critical current value of 980 A/cmw is obtained.

According to the manufacturing method of the high temperature superconducting wire according to the present disclosure as described above, the superconducting wire having the multiple superconducting layers may be easily manufactured in the desired multiple structures.

That is, in the high temperature superconducting wire 900 in which N superconducting layers are formed on the upper portion of the substrate according to the required current density, a stacked structure in which the first buffer layer 200, the first superconducting layer 420, the joining protective layer 600, the second superconducting layer 400 are stacked on the upper portion of the substrate 100 is provided as a basic structure. In addition, on the basis of this structure, N−2 joining protective layers and the N-th superconducting layer are sequentially provided on the upper portion of the second superconducting layer 440, and the outer protective layer is included on the upper portion of the finally stacked superconducting layer. (Here, N is a natural number equal to or greater than 3)

Meanwhile, when the superconducting layer is additionally stacked, the outer protective layer forms the additional joining protective layer by diffusion bonding to the protective layer of the additionally stacked superconducting wire through the thermal treatment. When the additional stacked is not performed, the outer protective layer forms the outermost protective layer, and the stabilizing layer for reinforcing mechanical properties can be formed, so that various multiple structures can be formed.

A high temperature superconducting wire according to the present disclosure has an advantage that multiple superconducting layers can be formed by easily and additionally stacking superconducting layers according to the required current density.

Therefore, the high temperature superconducting wire according to the present disclosure can be applied to electricity production, electricity systems, and energy consuming industries, as well as the industry fields related to high-temperature and low-magnetic field and the industry fields related to low-temperature and high-magnetic field. Further, based on this, the high temperature superconducting wire according to the present disclosure may be applied to more diverse product fields.

In addition, while the global superconducting market is estimated to exceed 113 billion dollars in 2050, the size and the application range of the superconducting market is expected to further expand according to the super grid for sharing electricity resources through linking multi-country electricity grids and to policy trends by country to promote superconducting technology. Therefore, the industrial applicability of the present disclosure is expected to increase.

What is claimed is:

1. A high temperature superconducting wire having multiple superconducting layers, the high temperature superconducting wire comprising:
    a main substrate;
    at least one buffer layer provided on an upper portion of the main substrate;
    at least two superconducting layers provided on an upper portion of the buffer layer;
    at least one joining protective layer provided on each space between the superconducting layers; and
    an outer protective layer formed of a same material as the joining protective layer and provided on an upper portion of an outermost superconducting layer,
    wherein the joining protective layer is formed by diffusion joining that is performed by a thermal treatment after protective layers of a pair of superconducting wires each having a stacked structure comprising a substrate, the superconducting layer, and the protective layer are facing each other, or is formed by diffusion joining that is performed by the thermal treatment after the protective layer of the superconducting wire having the stacked structure comprising the substrate, the superconducting layer, and the protective layer and the outer protective layer of the superconducting wire having a stacked structure comprising the substrate, the superconducting layer, the joining protective layer, the superconducting layer, and the outer protective layer are facing each other, wherein the outer protective layer is coated on the upper portion of the outermost superconducting layer while being in a state in which the substrate at one side is removed after the joining protective layer is formed.

2. The high temperature superconducting wire of claim 1, wherein the joining protective layer is formed in a state in which the joining protective layer is wound on a winding bobbin.

3. The high temperature superconducting wire of any claim 1, wherein a metal coating layer is further formed on at least an upper portion of the outer protective layer.

4. The high temperature superconducting wire of claim 1, wherein the joining protective layer and the outer protective layer are formed of one of silver (Ag), gold (Au), platinum (Pt), palladium (Pd), ruthenium (Ru), rhodium (Rh), iridium (Ir), osmium (Os), and rhenium (Re) or a mixture thereof.

5. A high temperature superconducting wire having multiple superconducting layers, the high temperature superconducting wire comprising:
   a main substrate;
   a buffer layer provided on an upper portion of the main substrate;
   a first superconducting layer provided on an upper portion of the first buffer layer;
   a second superconducting layer provided on an upper portion of the first superconducting layer;
   a joining protective layer provided between the first superconducting layer and the second superconducting layer and configured to connect the first superconducting layer and the second superconducting layer together; and
   an outer protective layer formed of a same material as the joining protective layer and provided on an upper portion of the second superconducting layer,
   wherein the joining protective layer is formed by diffusion joining that is performed by a thermal treatment after protective layers of a pair of superconducting wires each having a stacked structure comprising a substrate, the superconducting layer, and the protective layer are facing each other, or is formed by diffusion joining that is performed by the thermal treatment after the protective layer of the superconducting wire having the stacked structure comprising the substrate, the superconducting layer, and the protective layer and the outer protective layer of the superconducting wire having a stacked structure comprising the substrate, the superconducting layer, the joining protective layer, the superconducting layer, and the outer protective layer are facing each other,
   wherein the outer protective layer is coated on the upper portion of the outermost superconducting layer while being in a state in which the substrate at one side is removed after the joining protective layer is formed.

6. A high temperature superconducting wire having multiple superconducting layers, the high temperature superconducting wire comprising:
   a main substrate;
   a buffer layer provided on an upper portion of the main substrate;
   a first superconducting layer provided on an upper portion of the first buffer layer;
   a second superconducting layer provided on an upper portion of the first superconducting layer;
   a first joining protective layer provided between the first superconducting layer and the second superconducting layer and configured to connect the first superconducting layer and the second superconducting layer together;
   a third superconducting layer provided on an upper portion of the second superconducting layer;
   a second joining protective layer provided between the second superconducting layer and the third superconducting layer and configured to connect the second superconducting layer and the third superconducting layer together; and
   an outer protective layer provided on an upper portion of the third superconducting layer, the outer protective layer being stacked by a same structure as a stacked structure in which another joining protective layer between the second superconducting layer and the third superconducting layer and the third superconducting layer are stacked, thereby being provided on an upper portion of a 3+N-th superconducting layer after still another joining protective layer and another superconducting layer are repeatedly constructed N times on the upper portion of the third superconducting layer (here, N is a natural number).

7. The high temperature superconducting wire of claim 6, wherein a third joining protective layer repeatedly constructed N times on the upper portion of the third superconducting layer is formed by diffusion joining that is performed by a thermal treatment after a protective layer of the 3+N-th stacked superconducting layer and another outer protective layer that is provided on an upper portion of a 2+N-th superconducting layer are facing each other.

8. A high temperature superconducting wire manufacturing method, the method comprising:
   a stacking process in which protective layers of a pair of superconducting wires comprising at least a substrate, a superconducting layer, and the protective layer are stacked such that the protective layers are facing each other;
   a joining process in which the protective layers facing each other are diffusion joining together by performing a thermal treatment on the pair of superconducting wires that are stacked and the protective layers become a joining protective layer;
   an exfoliating process in which a layered structure on an upper portion of a corresponding superconducting layer is removed such that the superconducting layer on one side among the superconducting layers formed with the joining protective layer is exposed to an outside; and
   an outermost protective layer forming process in which an outer protective layer formed of a same material as the joining protective layer is formed on the upper portion of the superconducting layer that is exposed to the outside through the exfoliating process.

9. The method of claim 8, wherein a stabilizing layer forming process is performed when there is no additional stacking of the superconducting layer after the outer protective layer is formed.

10. The method of claim 8, wherein a paste filling process in which a gap between the stacked protective layers is filled with a same material as the protective layer is performed after the stacking process, and an interface between the protective layers and an interface of a filled paste are diffusion joining together and become one joining protective layer.

11. A high temperature superconducting wire manufacturing method, the method comprising:
- a stacking process in which a first superconducting wire comprising a substrate, a first buffer layer, a first superconducting layer, and a first protective layer and a second superconducting wire comprising another substrate, a second superconducting layer, and a second protective layer are stacked together such that the first protective layer and the second protective layer are facing each other;
- a joining process in which the stacked first and second protective layers are diffusion joining together by performing a thermal treatment and become a joining protective layer;
- an exfoliating in which a layered structure on an upper portion of the second superconducting layer is removed such that the second superconducting layer is exposed to an outside;
- an outer protective layer forming process in which an outer protective layer formed of a same material as the joining protective layer is formed on the upper portion of the second superconducting layer that is exposed to the outside;
- an additional stacking process in which an N-th protective layer of an N-th superconducting wire comprising still another substrate, an N-th superconducting layer, and the N-th protective layer is facing with the outer protective layer and is stacked;
- an additional joining process in which the outer protective layer and the N-th protective layer that are stacked are diffusion joining together by performing the thermal treatment and become an additional joining protective layer;
- an additional exfoliating process in which a layered structure on an upper portion of the N-th superconducting layer is removed such that the N-th superconducting layer is exposed to the outside; and
- an additional outermost protective layer forming process in which an additional outer protective layer formed of a same material as the additional joining protective layer is formed on the upper portion of the N-th superconducting layer that is exposed by performing the additional exfoliating process,
- wherein the additional stacking process, the additional joining process, the additional exfoliating process, and the additional outermost protective layer forming process are repeatedly performed N−2 times according to the number of superconducting layers that are stacked (here, N is a natural number equal to or greater than 3).

12. The method of claim 11, wherein a paste filling process in which a gap between the first protective layer and the second protective layer and a gap between the N-th protective layer and the outer protective layer are respectively filled with the same material is performed after the stacking process and the additional stacking process.

* * * * *